Brown & McGhie,
Beer Faucet,
N° 56,357. Patented July 17, 1866.
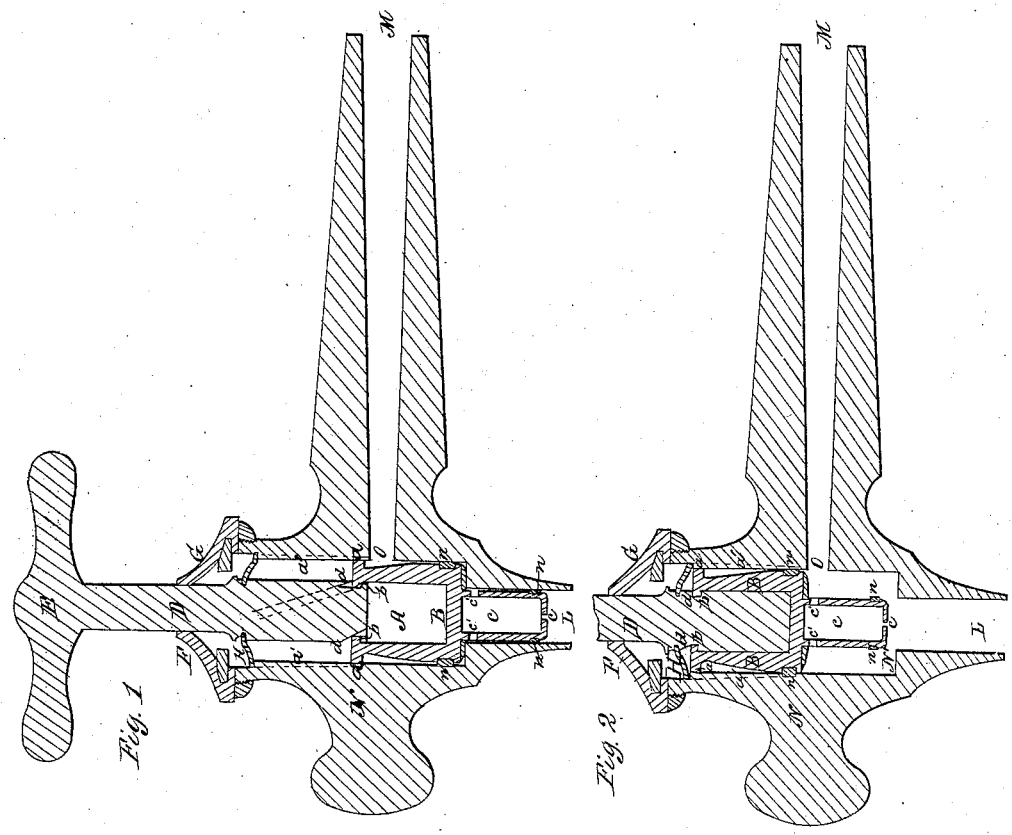
Witnesses:
J. B. Turchin
Jas R. Hayden
Inventors:
Charles Brown
Charles McGhie

United States Patent Office.

CHARLES BROWN AND C. McGHIE, OF CHICAGO, ILLINOIS.

IMPROVEMENT IN BEER-FAUCETS.

Specification forming part of Letters Patent No. 56,357, dated July 17, 1866.

*To all whom it may concern:*

Be it known that we, CHARLES BROWN and CHARLES McGHIE, of Chicago, in the county of Cook and State of Illinois, have invented a new and useful Improvement in the Faucets used for Beer or other Beverages; and we do hereby declare that the following is a full and exact description thereof, reference being had to the accompanying drawings, making part of this specification, in which—

Figure 1 represents a vertical section through the middle of the faucet, and Fig. 2 the position of the plunger when beer or other beverage is let out of the cask; Fig. 3, the grooved part of the stem D.

The object of our invention is to produce a faucet so arranged as, when it is used in casks or other vessels filled with beer, ale, or some other beverage which it is desirable to see foaming when glasses, measures, or other vessels are filled with it, to fill said glasses or other vessels with those beverages as conveniently as with a common faucet, producing at the same time the desirable foam.

To enable others skilled in the art to make and use our invention, we will describe its construction and operation.

We put into the barrel N of the faucet an independent plunger A, consisting of a head, B, open at the top and shut at the bottom, and a tail, C, shut at the bottom also, the whole made of one piece of metal. Besides the guides $a\ a$ of the plunger fitting into the grooves $a'\ a'$ of the barrel N, and besides the indentations on the outside of the plunger $n\ n$, to be filled with india-rubber or packing, there are two logs or projections, $b\ b$, inside of the head of the plunger, while its tail C has two openings on its sides, $C'\ C'$, and a small hole, $c$, in the bottom.

The stem D of the handle E, setting tight in the opening F of the cap G of the faucet, has its diameter enlarged below the washer H and and has two spiral grooves, $d\ d$, cut into its surface corresponding to the logs $b\ b$ of the plunger. The result of this arrangement is that when the cap G is screwed onto the barrel of the faucet every turn of the stem D one way or the other makes the plunger move up or down.

The operation consists in the following: When faucet is closed the tail $b$ of the plunger sets inside of the lip L and the head B closes the opening O of the faucet's tail communicating with cask M. To let beer into a glass or other vessel, the handle E and its stand D are turned, the spiral grooves $d\ d$ raise up the plunger, the opening O becomes unclosed, and the beer is let out, Fig. 2. In order to shut off the beer after the glass or other vessel is filled, the handle and its stem receive a counter-turn, the plunger moves rapidly down, closes up the opening O, while the tail $b$ closes the lip L, but the further pressure of the plunger forcing that small quantity of beer remaining between the head B of the plunger and the bottom N' of the barrel N to enter rapidly through the openings $C'\ C'$ into the tail C, and then to be discharged with great force through the hole $c$ into a glass or other vessel, producing in the beer, with which it is already filled, an abundant and fine foam.

What I claim as my invention, and desire to secure by Letters Patent, is—

The plunger B, provided with the hollow stem C, having the holes $C'\ C'$ and $c$ therein, as shown, in combination with the stem D, having the spiral grooves $d$ cut therein, when said parts are arranged to operate in connection with the body of the faucet, as and for the purpose set forth.

CHARLES $\times$ BROWN.
his mark.
CHARLES McGHIE.

Witnesses:
J. B. TURCHIN,
J. R. HAYDEN.